United States Patent
Fan et al.

(10) Patent No.: US 8,486,567 B2
(45) Date of Patent: Jul. 16, 2013

(54) BATTERIES, FUEL CELLS, AND OTHER ELECTROCHEMICAL DEVICES

(75) Inventors: Qinbai Fan, Chicago, IL (US); Ronald Stanis, Des Plaines, IL (US)

(73) Assignee: Gas Technology Institute, Des Plaines, IL (US)

( * ) Notice: Subject to any disclaimer, the term of this patent is extended or adjusted under 35 U.S.C. 154(b) by 425 days.

(21) Appl. No.: 12/776,470

(22) Filed: May 10, 2010

(65) Prior Publication Data

US 2011/0274988 A1 Nov. 10, 2011

(51) Int. Cl.
| *H01M 4/72* | (2006.01) |
| *H01M 4/36* | (2006.01) |
| *H01M 6/24* | (2006.01) |
| *H01M 4/64* | (2006.01) |
| *H01M 8/16* | (2006.01) |
| *H01M 2/38* | (2006.01) |
| *H01M 2/40* | (2006.01) |
| *H01M 8/24* | (2006.01) |
| *H01M 2/08* | (2006.01) |
| *H01M 2/14* | (2006.01) |
| *H01M 4/66* | (2006.01) |
| *H01M 4/13* | (2010.01) |
| *H01M 6/48* | (2006.01) |
| *H01M 10/18* | (2006.01) |

(52) U.S. Cl.
USPC ........... 429/234; 429/101; 429/199; 429/210; 429/233; 429/401; 429/457; 429/509; 429/518; 429/519

(58) Field of Classification Search
USPC ................. 429/400, 401, 452, 457, 508, 518, 429/519, 146, 147, 199, 101, 210, 233, 234, 429/509
See application file for complete search history.

(56) References Cited

U.S. PATENT DOCUMENTS

| 4,124,693 A | | 11/1978 | Shropshire et al. |
| 4,731,311 A | * | 3/1988 | Suzuki et al. ................. 429/213 |
| 4,977,046 A | * | 12/1990 | Bleszinski et al. ............ 429/224 |
| 5,436,092 A | * | 7/1995 | Ohtsuka et al. ............ 429/218.1 |
| 5,512,392 A | * | 4/1996 | Fauteux et al. ............ 429/231.8 |
| 5,591,538 A | | 1/1997 | Eidler et al. |
| 6,024,964 A | * | 2/2000 | Jung et al. .................. 424/208.1 |
| 6,451,471 B1 | * | 9/2002 | Braun .......................... 429/480 |
| 2002/0037451 A1 | | 3/2002 | Eguchi et al. |
| 2004/0122178 A1 | | 6/2004 | Huang et al. |
| 2004/0197641 A1 | | 10/2004 | Visco et al. |
| 2004/0224205 A1 | | 11/2004 | Marianowski et al. |
| 2005/0255345 A1 | | 11/2005 | Gerritse et al. |
| 2010/0009233 A1 | | 1/2010 | Blanchet et al. |

* cited by examiner

*Primary Examiner* — Patrick Ryan
*Assistant Examiner* — Julian Anthony
(74) *Attorney, Agent, or Firm* — Pauley Petersen & Erickson

(57) ABSTRACT

An electrochemical device having an anode electrode, a cathode electrode, and an electrolyte. At least one of the anode electrode and the cathode electrode is provided with a substantially uniform superficial relief pattern formed by a plurality of substantially uniform projections and has an electrical conductivity gradient between peaks of the projections and valleys between the projections.

48 Claims, 4 Drawing Sheets

BATTERIES, FUEL CELLS, AND OTHER ELECTROCHEMICAL DEVICES

BACKGROUND OF THE INVENTION

1. Field of the Invention

This invention relates to electrochemical devices and components thereof. In one aspect, this invention relates to batteries. In one aspect, this invention relates to fuel cells. In one aspect, this invention relates to non-rechargeable batteries. In one aspect, this invention relates to rechargeable batteries. In one aspect, this invention relates to metal-air batteries. In one aspect, this invention relates to $Li\text{---}Br_2$ batteries. In one aspect, this invention relates to LiBr flow batteries.

2. Description of Related Art

Electrochemistry is a branch of chemistry which involves the study of chemical reactions which take place in a solution at the interface of an electron conductor (a metal or a semiconductor) and ionic conductor (the electrolyte), and which involves electron transfer between the electrode and the electrolyte or species in solution. Chemical reactions driven by an external applied voltage, as in electrolysis, or chemical reactions which create a voltage, such as a battery, are electrochemical reactions.

Batteries are electrochemical cells used for chemical energy storage and are optimized to produce a constant electric current for as long as possible. Today, there are a variety of alternative commercially available battery technologies—dry cells which use a moist electrolyte paste rather than a fluid electrolyte; lead-acid batteries in which a lead anode and a lead dioxide cathode packed in a metal plaque are submerged in an electrolyte solution of sulfuric acid; lithium rechargeable batteries which use a solid electrolyte instead of an aqueous electrolyte or moist electrolyte paste; and flow batteries in which the majority of the electrolyte, including dissolved reactive species, is stored in separate tanks and pumped through a reactor containing the electrodes and the battery is charged or discharged. Flow batteries of current interest include iron/chromium flow batteries, vanadium redox batteries, zinc-bromine flow batteries, and lithium-bromine flow batteries.

Fuel cells are electrochemical devices comprising an anode electrode, a cathode electrode, and an electrolyte disposed there between, which are used to generate electricity. In contrast to batteries in which the reactants are depleted over time, fuel cells require continuous replenishment of the reactants consumed therein.

It will be appreciated by those skilled in the art that there are a variety of factors, depending upon the type of the electrochemical device, which can affect the performance of the electrochemical device. For example, the amount of surface area available on the electrodes for reactions may affect reaction rates which, in turn, may affect the output of the device. In some electrochemical devices, performance may be affected by the ability of the reactants to mix. In some electrochemical devices, performance may be affected by the ability to control heat generated by the device. In yet other electrochemical devices, performance, e.g. electrical conductivity, may be affected by the materials used to make the components of the device.

SUMMARY OF THE INVENTION

Generally, it is an object of this invention to improve performance of electrochemical devices such as batteries, fuel cells, biofuel cells, and the like.

This and other objects of this invention are addressed by an electrochemical device comprising an anode electrode, a cathode electrode, and an electrolyte in which at least one of the anode electrode and the cathode electrode comprises a substantially uniform superficial relief pattern formed by a plurality of substantially uniform raised structures or projections having an electrical conductivity gradient between peaks of the raised structures and valleys between the raised structures, where the electrical conductivity is lower at the peaks than in the valleys. Conventional electrochemical devices typically employ components having substantially smooth surfaces. The raised structures may be semi-spherical, semi-elliptical, polyhedral or combinations thereof. Particularly preferred are raised structures having a tetrahedral shape. Such raised structures provide substantial increases in component surface areas compared with conventional electrochemical device components, thereby enhancing ion conductivity, heat transfer and turbulence of the reactants. In electrochemical devices employing a separator between the anode and cathode electrodes, the separator may also be provided with such raised structures so as to enhance separator performance. In electrochemical devices in which the electrolyte is a solid, the solid electrolyte may also be provided with such raised structures.

BRIEF DESCRIPTION OF THE DRAWINGS

This and other objects and features of this invention will be better understood from the following detailed description taken in conjunction with the drawings, wherein.

DETAILED DESCRIPTION OF THE PRESENTLY PREFERRED EMBODIMENTS

Figure 1:
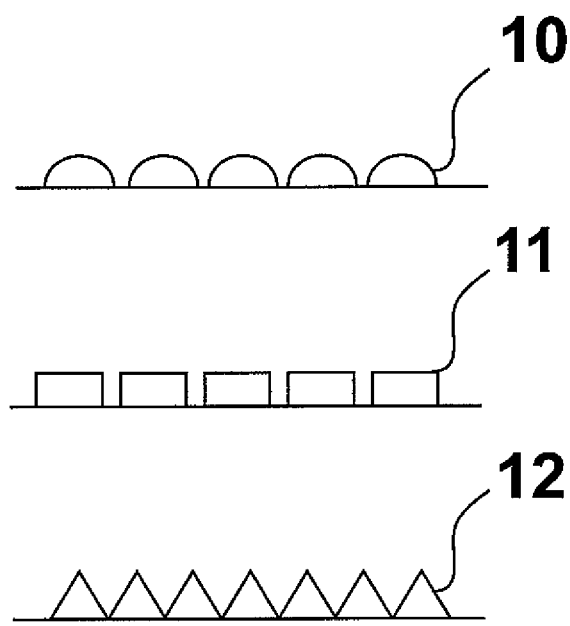
FIG. 1 is a diagram of various profiles for raised structures suitable for use in the electrochemical devices of this invention.
Figure 2:
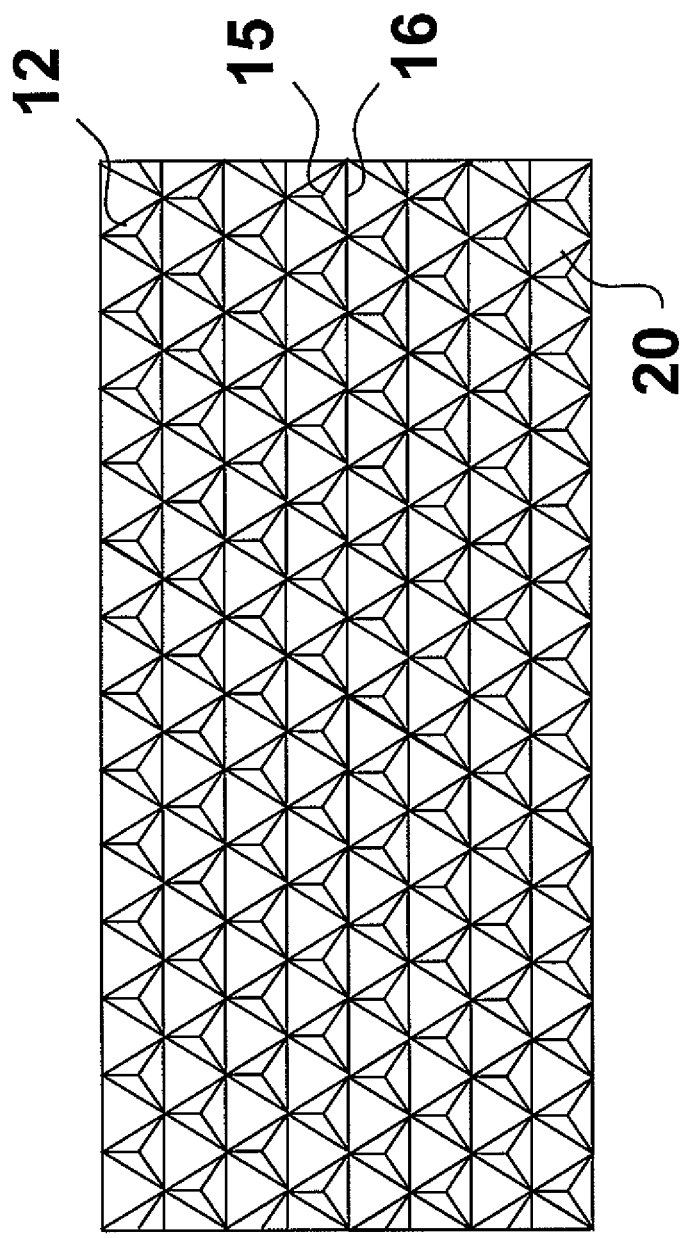
FIG. 2 is a top view of an electrode surface having tetrahedral shaped projections in accordance with one embodiment of this invention.

The invention disclosed and claimed herein involves the use of one or more components of an electrochemical device comprising a substantially uniform superficial relief pattern in order to enhance the performance of the component or components, thereby enhancing the performance of the electrochemical device. The substantially uniform superficial relief pattern is formed by a plurality of substantially uniformly distributed raised structures or projections on at least one surface of the component or components. As used herein, the terms "raised structure" and "projection", which are used interchangeably herein, refer to a protrusion or structure extending away from a base of an electrochemical device component. Explicitly excluded from the definition of the terms "raised structure" and "projection" are corrugated structures, that is, structures comprising a series of parallel ridges and furrows or channels. Exemplary raised structures suitable for use in the electrochemical devices of this invention have semi-spherical 10, or polyhedral shapes 11, 12 as shown in FIG. 1. The projections may be formed by embossing, hot pressing, or extrusion. In accordance with one particularly preferred embodiment of this invention, the projections have a tetrahedral shape. FIG. 2 shows a top view of an electrode in accordance with one embodiment of this invention comprising a plurality of substantially uniform superficial tetrahedral structures 12 having a peak 15 and a base 16. The tetrahedral structures are aligned so as to form valleys 20 between adjacent tetrahedral structures. It will be appreciated by those skilled in the art that the projections not only increase the available surface area for heat transfer or reactions to occur compared with substantially flat elements, but also increase turbulence of the reactants. It is to be understood that, although the primary description herein of the invention is in the context of batteries and, in particular, LiBr flow batteries, the invention may be employed in any electrochemical device, for example, fuel cells and biofuel cells, and such electrochemical devices are to be understood to be within the scope of this invention.

As previously indicated, the raised structures or projections may be formed by embossing, hot pressing, or extrusion. Each of these methods takes advantage of a "skin-effect" of the binders employed in making the electrodes. The skin-effect refers to an electrode surface condition in which a majority of the binder used to make the electrodes is disposed at the surface of the electrodes compared with the bulk of the electrodes. The result is the creation of electrodes having low electrical conductivity at the peaks of the raised structures and higher electrical conductivity in the bulk of the electrodes, especially in the valleys between adjacent raised structures. A benefit of this arrangement is that the electrode is able to compensate for resistance losses due to the thickness of the electrolyte. Because aromatic rings cannot tolerate high oxidative chemicals in flow batteries, binders suitable for use in the electrodes in accordance with one embodiment of this invention may be non-aromatic polymers or resins. In accordance with one preferred embodiment of this invention, the binders are selected from the group consisting of pure hydrocarbon (CH) chain polymers, fluorocarbon (FH) chain polymers and mixtures thereof.

A lithium-ion battery is a type of rechargeable battery in which lithium ions move between the anode and cathode electrodes during discharge and recharging of the battery. Lithium-ion batteries typically use an intercalated lithium compound as the electrode material. The electrolyte may be a non-aqueous solvent with dissolved lithium salts. Suitable solvents include poly acrylonitrile (PAN), poly ethylene oxide (PEO), propylene carbonate (PC), ethylene carbonate (EC), acetonitrile (AN) and the like. Suitable salts may be selected from the group consisting of $LiCF_3SO_3$, LiBr, $LiClO_4$, $LiPF_6$, and the like.

Lithium batteries, both primary and secondary, have high power density and high energy density. Currently, the Li—$(CF)_n$ battery has the highest theoretical energy density (2180 Wh/kg) and the Li—$SOCl_2$ battery has a theoretical energy density of 1470 Wh/kg. However, Li—$(CF)_n$ batteries have the problem of producing insoluble LiF precipitation at the anode side while Li—$SOCl_2$ batteries have the problem of generating gases when charged with internal pressure increases. As a result, safety of the batteries is problematic.

One application of the electrode structures in accordance with one embodiment of this invention is high power lithium-bromine batteries. The batteries in accordance with one embodiment of this invention comprise cathode electrodes at which liquid bromine is immobilized to form a complex on the electrode. The electrode comprises carbon or graphite and a binder. The binder is selected to make the carbon electrode and form a solid complex with bromine. The binder preferably is a polymer comprising at least one of primary, secondary, tertiary, and quaternary amine groups, which form complexes with bromine. A higher concentration of quaternary amine groups is most preferred. The polymer preferably comprises a hydrocarbon structure without aryl rings and is stable in bromine liquid. In operation, the amine groups form complexes with $Br_2$. Liquid $Br_2$ is formed at the cathode electrode of batteries containing bromine salts. During charging of a LiBr battery, $Li^+$ is reduced to Li metal which deposits as a solid on the anode electrode. At the cathode electrode, $Br^-$ is oxidized to produce liquid $Br_2$. The liquid $Br_2$ must be immobilized at the cathode in order to prevent it from crossing over through the separator membrane resulting in self discharge. In accordance with one embodiment, the electrolyte is a non-aqueous solvent with dissolved lithium salts. It will be appreciated that this invention may be applied to other bromine containing batteries, such as $ZnBr_2$, and such applications are to be understood to be within the scope of this invention.

Figure 3:
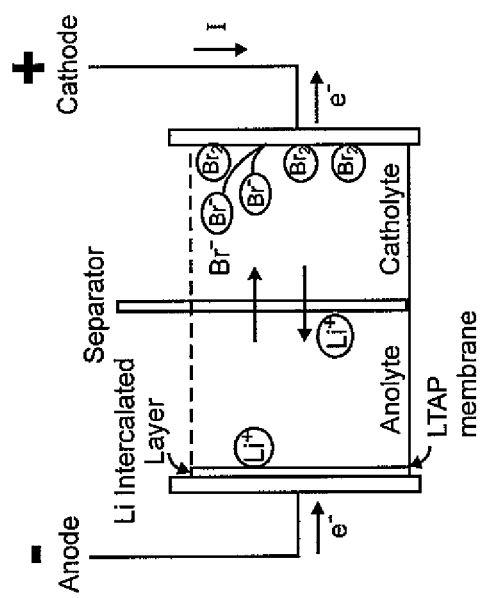
FIG. 3 is a schematic diagram showing a lithium-bromine flow battery in accordance with one embodiment of this invention.

In accordance with one embodiment of this invention, the electrolyte is an aqueous LiBr solution. In this embodiment, shown in FIG. 3, the anode is a lithium intercalated graphite electrode which utilizes a water impermeable, lithium-ion conductive coating or membrane to prevent contact with the aqueous solution while still permitting lithium ion transport. In accordance with one embodiment, the membrane is a $Li_2O$—$Al_2O_3$—$TiO_2$—$P_2O_5$ (LATP) polymer composite membrane having a thickness less than about 100 µm. This membrane shows good lithium conductivity without water permeability. The membrane separates the lithium metal from the aqueous LiBr solution and eliminates metal dendrites, which are a serious problem for conventional batteries and flow batteries. In addition, and surprisingly, the membrane also eliminates bromine crossover.

The carbon electrodes may be made by mixing graphite or carbon with the polymer binder. The binder is a polyacrylic acid and/or poly(ethylene-co-acrylic acid) copolymer, i.e. $(-CH_2CH_2-)_x[CH_2CH(CO_2H)-]_y$ having different levels of acrylic acid, which reacts with pyrrolidine, piperidine, and other primary or secondary amines to form amides, which are then reduced by $LiAlH_4$ diethyl ether solution. The final binder structure is a polymerized amine, which reacts with alkyl bromides such as methyl bromide or ethyl bromide to form tertiary or quaternary amine bromides, which are key groups for complexing with bromine.

During electrical charging of the battery, the bromine complex swells the carbon electrode, and during electrical discharging of the battery, the carbon electrode shrinks. The high surface carbon/polymer combinations in accordance with this invention reduce the swelling effect of the electrode during charging and discharging. In addition, because the electrode surface is patterned with raised structures or projections as discussed herein above, reversibility of the electrode structure during swelling/shrinking (charge/discharge) is enabled.

A lithium-bromine battery has a theoretical power density of about 116 Wh/kg. The battery power density and energy density depend in part on the percentage of the tertiary or quaternary amine group. For example, for polyethylene acrylic acid binder with 20% acrylic acid, 1 mole of polymer (220 g) complexes one mole of bromine (160 g) or generates 80 Wh electricity (or 210 Wh/kg). A cathode electrode having 70% binder with carbon should provide an energy density of about 350 Wh/kg. In order to increase the acrylic acid content, polyacrylic acid is added as a binder with polyethylene-co-acrylic acid for the battery. Sixty weight percent quaternary ammonium in the compound, the weight of quaternary ammonium being 3.49 g (5.81 g total polymer), can complex 11.75 g bromine. Using 70% polymer and 30% carbon, the total weight of the electrode would be about 8.3 g, which could complex 11.75 g bromine (5.88 Wh). Thus, the energy density will be 293 Wh/kg, which is twice the energy density of a known UBI-259 Li—SO$_2$ battery. Thus, energy density increases with increases in the percentage of quaternary ammonium. In addition, another portion of the bromine may be absorbed on active carbon. The formation of bromine on the carbon surface reduces electrode polarization potential.

EXAMPLE

Many amine containing compounds may be used to produce the electrodes of this invention. In this example, 50% by wt carbon is mixed with 25% by wt poly(ethylene-co-acrylic acid) (20% by weight acrylic acid) and 25% by wt pyrrolidine, producing a slurry. The slurry is poured into a plastic or metal die and hot pressed at pressures as low as 100 psi and temperatures as low as 110° C., although an elevated pressure of about 1000 psig and an elevated temperature of about 150° C. are preferred. Water is formed as a byproduct of the reaction which may be baked off at elevated temperatures (greater than about 150° C.). During this baking, any unreacted pyrrolidine will evaporate away as well. The C=O may be converted to CH$_2$ by soaking the electrode in reduced LiAlH$_4$ diethyl ether solution. The tertiary group may then be converted to a quaternary amine group by reaction with ethylbromide.

EXAMPLE

Figure 4:
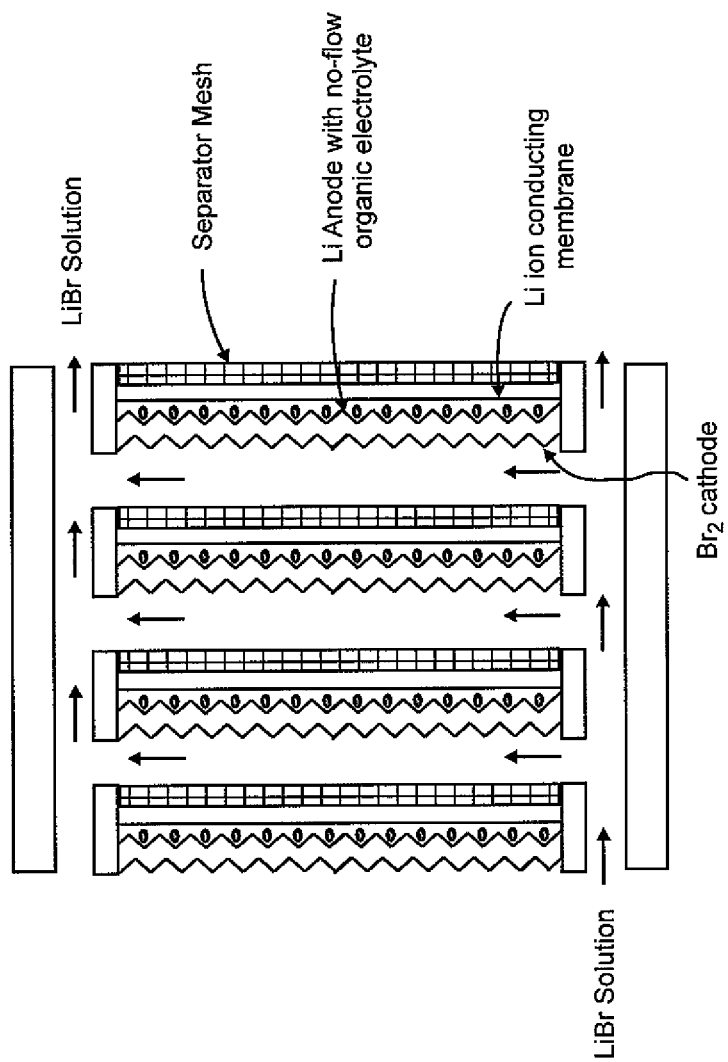
FIG. 4 is a schematic diagram of a LiBr flow battery in accordance with one embodiment of this invention.

In a LiBr flow battery in accordance with one embodiment of this invention, the anode and cathode electrodes are 50 wt % graphite and 50 wt % polymer, the latter containing quaternary amine groups. A separator membrane of microporous polyethylene is provided between the anode and cathode electrodes as shown in FIG. 4. The analyte and catholyte are 1M LiBr and 0.25M N-ethyl-N-methylpyrrolidinium bromide in anhydrous acetonitrile. The electrolyte preparation and flow cell assembly are performed in a N$_2$ environment that is completely free of water. When the entire assembly is complete, it is sealed from the environment to protect against moisture contamination. A pump is used to circulate the liquid electrolytes through the anode and cathode chambers in the flow battery. The charging capacity of the battery depends on the volume of electrolyte which may be as little as 5 ml or as much as 500 gallons. During charging, Li$^+$ is reduced to Li metal which is deposited as a solid on the anode electrode. At the cathode, Br$^-$ is immediately immobilized by complexing with the quaternary ammonium groups bound to the polymer binder within the graphite electrode. The complexed Br$_2$ may be transferred to be complexed with the N-ethyl-N-methylpyrrolidinium bromide which is dissolved in the solution. The flow battery may be charged at current densities between 0 and 100 mA/cm$^2$ at voltages between 3.6 V and 7.0 V. The open circuit is 3.6 V. The flow battery may be discharged below 3.6 V at current densities up to 100 mA/cm$^2$. These flow batteries are ideal for stationary electricity storage and release in various applications such as solar, wind, or hydroelectric plants. These flow batteries may also be used for portable power, such as in automobiles.

EXAMPLE

In this example, graphite bipolar plates and endplates are made by hot pressing a dry mixture of 50 wt % graphite having an average particle size of about 100 μm and 50 wt % ultra high molecular weight polyethylene (powdered form). Hot pressing is carried out at about 350° F. and 10,000 lbs for five minutes. Hot rolling may be done at 350° F., 100 psi at 1 in/sec.

EXAMPLE

In this example, a li-ion conducting solid comprising 14Li$_2$O; 9Al$_2$O$_3$; 38 TiO$_2$: 39 P$_2$O is produced by mixing 6.2 g Li$_2$CO$_3$, 5.51 g Al$_2$O$_3$, 18.21 g TiO$_2$, and 53.83 g NH$_4$H$_2$PO$_4$ placing the mixture in an alumina crucible and melting the mixture in a furnace. The mixture is initially heated to 450° C. at a heating rate of 4.8° C./min and held at that temperature for 1 hour to release gaseous components. The mixture is then heated to 1450° C. at a heating rate of 5° C./min and melted for 1.5 hours. The resulting melt is poured into ice water, producing a crystallized glass-ceramic material. Subsequently, this crystallized glass-ceramic material is crushed into chunks and powdered.

The powdered material was mixed with high density polyethylene powder to make a blend of 75 wt % Li glass-ceramic, 25 wt % polyethylene. This material was then placed in a 2.25" diameter stainless steel die and hot pressed at 15,000 lbs and 400° F. The pressure was applied for 30 minutes to ensure that the metal die had fully heated. The resulting membrane was 35 mil thick.

A membrane was placed into a water permeation cell in which water at 10 psig was placed on one side of the membrane while the other side was open to the atmosphere with a tube to collect the permeate. After two hours, no water had been detected at the permeate side. When the cell was disassembled, no water bubbles were visible on the permeate side.

An identical membrane was placed into a conductivity cell. The membrane divided two cells, each containing 1M LiClO$_4$ in propylene carbonate. Impedance spectroscopy was used to measure the membrane conductivity. The conductivity at room temperature was measured to be $2*10^{-5}$ S/cm. This value was verified by a repeat experiment using a new membrane. This value is within the same order of magnitude as the pure glass-ceramic material.

While in the foregoing specification this invention has been described in relation to certain preferred embodiments thereof, and many details have been set forth for purpose of illustration, it will be apparent to those skilled in the art that the invention is susceptible to additional embodiments and that certain of the details described herein can be varied considerably without departing from the basic principles of the invention.

We claim:

1. In an electrochemical device having an anode electrode, a cathode electrode, and an electrolyte, the improvement comprising:
    at least one of said anode electrode and said cathode electrode having a substantially uniform superficial relief pattern formed by a plurality of substantially uniform projections having an electrical conductivity gradient between peaks of said projections and valleys between said projections, wherein said peaks of said projections are coated with a substantially non-electrically conductive material.

2. The electrochemical device of claim 1, wherein
    said electrical conductivity at said peaks is lower than said electrical conductivity in said valleys.

3. The electrochemical device of claim 1, wherein said projections have a geometrical shape selected from the group consisting of semi-spherical, polyhedral and combinations thereof.

4. The electrochemical device wherein said projections have a tetrahedral shape.

5. The electrochemical device Of claim 1, wherein said electrolyte is one of an aqueous solution and a non-aqueous solution.

6. The electrochemical device of claim 5, wherein said electrochemical device is one of a LiBr battery and a LiBr flow battery.

7. The electrochemical device of claim 6 further comprising an ion-conductive separator between said anode electrode and said cathode electrode.

8. The electrochemical device of claim 7, wherein said ion-conductive separator comprises a polymeric membrane.

9. The electrochemical device of claim 8, wherein said polymeric membrane comprises a Li-ion conductive solid.

10. The electrochemical device of claim 1, wherein said electrochemical device is a fuel cell.

11. The electrochemical device of claim 1, wherein said electrochemical device is a biofuel cell.

12. The electrochemical device of claim 1, wherein said anode electrode is a lithium-intercalatable electrode having a water impermeable coating.

13. The electrochemical device of claim 12, wherein said lithium-intercalatable electrode comprises one of graphite and carbon.

14. In an electrochemical device having an anode electrode, a cathode electrode, and an electrolyte, the improvement comprising:
at least one of said anode electrode and said cathode electrode having a substantially uniform superficial relief pattern formed by a plurality of substantially uniform projections having an electrical conductivity gradient between peaks of said projections and valleys between said projections;
an ion-conductive separator between said anode electrode and said cathode electrode, wherein said separator comprises a substantially uniform separator relief pattern.

15. The electrochemical device of claim 14, wherein said peaks of said projections are coated with a substantially non-electrically conductive material.

16. The electrochemical device of claim 14, wherein said substantially uniform separator relief pattern is formed by a plurality of substantially uniform separator projections.

17. The electrochemical device of claim 16, wherein said separator projections have a geometrical shape selected from the group consisting of semi-spherical, polyhedral, and combinations thereof.

18. The electrochemical device of claim 17, wherein said separator projections have a tetrahedral shape.

19. In an electrochemical device having an anode electrode, a cathode electrode, and an electrolyte, the improvement comprising:
at least one of said anode electrode and said cathode electrode having a substantially uniform superficial relief pattern formed by a plurality of substantially uniform projections having an electrical conductivity gradient between peaks of said projections and valleys between said projections, wherein said cathode electrode comprises one of graphite and carbon particles bound together by a polymer binder, which polymer binder forms a complex with bromine on a cathode surface of said cathode electrode.

20. The electrochemical device of claim 19, wherein said polymer binder comprises a polymer having at least one a primary amine group, a secondary amine group, a tertiary amine group, and a quaternary amine group.

21. The electrochemical device of claim 19, wherein said polymer binder comprises a polymer having a quaternary amine group.

22. An apparatus comprising:
an anode electrode, a cathode electrode, and an electrolyte disposed between said anode electrode and said cathode electrode, at least one of said anode electrode and said cathode electrode having a tetrahedral structure having a plurality of peaks and a plurality of valleys and having an electrical conductivity gradient such that electrical conductivity at said peaks is lower than electrical conductivity in said valleys.

23. The apparatus of claim 22, wherein tetrahedral structure is coated by a coating material having a lower electrical conductivity than a bulk of said tetrahedral structure.

24. The apparatus of claim 23 wherein said bulk of said tetrahedral structure comprises an electrically conductive material selected from the group consisting of carbon, graphite, metal, metal alloy, and mixtures thereof.

25. The apparatus of claim 24, wherein said bulk of said tetrahedral Structure further comprises a binder material.

26. The apparatus of claim 25, wherein said binder material is selected from the group consisting of resins and non-aromatic polymers.

27. The apparatus of claim 26, wherein said binder material is selected from the group consisting of substantially pure hydrocarbon chain polymers, fluorocarbon chain polymers, and mixtures thereof.

28. The apparatus of claim 23, wherein said coating material is a binder material.

29. In a battery having an anode electrode, a cathode electrode, and an electrolyte, the improvement comprising:
at least one of said anode electrode and said cathode electrode having a substantially uniform superficial relief pattern formed by a plurality of substantially uniform projections having an electrical conductivity gradient between peaks of said projections and valleys between said projections, wherein said peaks or said projections are coated with a substantially non-electrically conductive material.

30. The battery of claim 29, wherein said projections have a tetrahedral shape.

31. The battery of claim 29, wherein said electrolyte is one of an aqueous solution and a non-aqueous solution.

32. The battery of claim 31, wherein said electrolyte comprises a LiBr solution.

33. The battery of claim 32 further comprising an ion-conductive separator between said anode electrode and said cathode electrode.

34. The battery of claim 33, wherein said ion-conductive separator comprises a polymeric membrane comprising a Li-ion conductive solid.

35. The battery of claim 34, wherein said anode electrode is a lithium-intercalatable electrode having a water impermeable coating.

36. The battery of claim 35, wherein said lithium-intercalatable electrode comprises one of graphite and carbon.

37. The battery of claim 36, wherein said cathode electrode comprises one of graphite and carbon particles bound together by a polymer binder, which polymer binder forms a complex with bromine on a cathode surface of said cathode electrode.

38. The battery of claim 37, wherein said polymer binder comprises a polymer having at least one of a primary amine group, a secondary amine group, a tertiary amine group, and a quaternary amine group.

39. An electrochemical device comprising:
a bipolar element having an anode side and a cathode side, at least one of said anode side and said cathode side having it substantially uniform superficial relief pattern formed h a plurality of substantially uniform projections having an electrical conductivity gradient between peaks of said projections and valleys between said projections; and an electrolyte comprising one of an aqueous solution and a non-aqueous solution.

40. The electrochemical device of claim 39, wherein said projections have a tetrahedral shape.

41. The electrochemical device of claim 40, wherein said electrolyte comprises a LiBr solution.

42. The electrochemical device of claim 41 comprising a plurality of spaced apart said bipolar elements arranged whereby said anode side of one of said bipolar elements faces said cathode side of another of said bipolar elements.

43. The electrochemical device of claim 42 further comprising an ion-conductive separator between said spaced apart bipolar elements.

44. The electrochemical device of claim 43, wherein said ion-conductive separator is Li-ion conductive.

45. The electrochemical device of claim 44, wherein said ion-conductive separator comprises a polymeric membrane comprising a Li-ion conductive solid.

46. The electrochemical device of claim 45 wherein said cathode electrode comprises one of graphite and carbon particles bound together by a polymer binder, which polymer binder forms a complex with bromine on a cathode surface of said cathode electrode.

47. The electrochemical device of claim 46, wherein said polymer binder comprises a polymer having at least one of a primary amine group, a secondary amine group, a tertiary amine group, and a quaternary amine group.

48. A battery comprising:

an electrolyte comprising at least one lithium salt;

a lithium intercalated graphite anode electrode having lithium-ion conductive coating;

a cathode electrode adapted to immobilize liquid bromine and form a complex on said cathode electrode; and a separator disposed between said anode electrode and said cathode electrode: and at least one of said anode electrode and said cathode electrode comprising a substantially uniform superficial relief pattern formed by a plurality of substantially uniform raised structures and at least one of said anode electrode and said cathode electrode comprising an electrical conductivity gradient wherein electrical conductivity at peaks of said substantially uniform raised structures is lower than electrical conductivity in valleys between said raised structures.

* * * * *